(12) United States Patent
Hu et al.

(10) Patent No.: US 11,418,779 B2
(45) Date of Patent: Aug. 16, 2022

(54) CLIPPING INDICES CODING FOR ADAPTIVE LOOP FILTER IN VIDEO CODING

(71) Applicant: QUALCOMM Incorporated, San Diego, CA (US)

(72) Inventors: Nan Hu, San Diego, CA (US); Vadim Seregin, San Diego, CA (US); Hilmi Enes Egilmez, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/897,049

(22) Filed: Jun. 9, 2020

(65) Prior Publication Data

US 2020/0396452 A1    Dec. 17, 2020

Related U.S. Application Data

(60) Provisional application No. 62/859,948, filed on Jun. 11, 2019.

(51) Int. Cl.
| | |
|---|---|
| *H04N 19/17* | (2014.01) |
| *H04N 19/117* | (2014.01) |
| *H04N 19/46* | (2014.01) |
| *H04N 19/186* | (2014.01) |
| *H04N 19/176* | (2014.01) |

(52) U.S. Cl.
CPC ......... *H04N 19/117* (2014.11); *H04N 19/176* (2014.11); *H04N 19/186* (2014.11); *H04N 19/46* (2014.11)

(58) Field of Classification Search
CPC .. H04N 19/117; H04N 19/176; H04N 19/186; H04N 19/46; H04N 19/70; H04N 19/82; H04N 19/91
See application file for complete search history.

(56) References Cited

U.S. PATENT DOCUMENTS

| | | | |
|---|---|---|---|
| 9,615,093 | B2 | 4/2017 | Fu et al. |
| 10,070,125 | B2 | 9/2018 | Hannuksela |
| 2011/0249725 | A1* | 10/2011 | Auyeung ............. H04N 19/159 375/240.03 |
| 2011/0305277 | A1 | 12/2011 | Fu et al. |
| 2014/0294061 | A1 | 10/2014 | Zhang et al. |

(Continued)

FOREIGN PATENT DOCUMENTS

| | | |
|---|---|---|
| WO | 2011140960 A1 | 11/2011 |
| WO | 2020151714 A1 | 7/2020 |
| WO | 2020224545 A1 | 11/2020 |

OTHER PUBLICATIONS

ITU-T H.265, "Series H: Audiovisual and Multimedia Systems, Infrastructure of Audiovisual Services—Coding of Moving Video, High efficiency Video Coding," The International Telecommunication Union, Dec. 2016, 664 Pages.

(Continued)

*Primary Examiner* — Md N Haque
(74) *Attorney, Agent, or Firm* — Shumaker & Sieffert, P.A.

(57) ABSTRACT

A video coder is configured to code an adaptive loop filter (ALF) clipping index as a fixed-length unsigned integer. The video coder may apply, based on the ALF clipping index, an ALF to a block of a picture of the video data.

33 Claims, 10 Drawing Sheets

(56) References Cited

U.S. PATENT DOCUMENTS

2014/0314140 A1* 10/2014 Rapaka ............... H04N 19/70
                                                  375/240.02
2019/0200044 A1*  6/2019 Galpin ............... H04N 19/463
2019/0387225 A1  12/2019 Saitou et al.

OTHER PUBLICATIONS

Chen J., et al., "Algorithm Description of Joint Exploration Test Model 1," 1, JVEI Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ no. JVET-A1001 Feb. 24, 2016 (Feb. 24, 2016), XP030150000, 27 pages.

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v7, 386 Pages.

Chen J., et al., "Algorithm Description for Versatile Video Coding and Test Model 5 (VTM 5)", 14th JVET Meeting Mar. 19, 2019-Mar. 27, 2019; Geneva; (The Joint Video Exploration Team of ISO/IEC JTC1/SC29/WG11 and ITU-T SG.16), No. JVET-N1002-v1, May 21, 2019, XP030205194, Retrieved from the Internet: URL:http://phenix.int-evry.fr/jvet/doc_end_user/documents/14_Geneva/wg11/JVET-N1002-v1.zip JVET-N1002-v1.docx, 70 pages.

International Search Report and Written Opinion—PCT/US2020/037217—ISA/EPO—dated Sep. 3, 2020 15 Pages.

Chang, Y-L. et al., "TE10 Subtest 3: Controlled Clipping", Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 94. MPEG Meeting (Motion Picture Expert Group or ISO/IEC JTC1/SC29/WG11), JCTVC-C146, WG11 No. m18172, Oct. 2, 2010 (Oct. 2, 2010), XP030046762, section 2.2. 10 pages.

Taquet (Canon) J., et al., "CE5: Results of Tests CE5-3.1, CE5-3.2, CE5-3.3 and CE5-3.4 on Non-Linear Adaptive Loop Filter," 14. JVET Meeting; Mar. 19, 2019-Mar. 27, 2019; Geneva (The Joint Video Exploration Teamof ISO/IEC JTC1/SC29/WG11 and ITU-T SG.16, No. JVET-N0242,Mar. 19, 2019 (Mar. 19, 2019), XP030203663, 10 pages, Retrieved from the Internet:URL:http://phenix.int-evry.fr/jvet/doc_end_user/documents/14_Geneva/wg11/JVET-N0242-v2.zip JVET-N0242 v2.0.docx , [retrieved on Mar. 19, 2019].

Zhang, L. et al., "Non-CE5: Modified Coding Method for ALF Clipping Parameters", JVET-O0067-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.

Kotra, A.M. et al., "Non-CE5: Alternative Signalling for ALF Clipping Parameters", JVET-O0047-v2, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-7.

Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010-v1, pp. 1-6.

JVET: "VTM-5.0, Tags, JVET/VVCSoftware_VTM, GitLab", Frank Bossen, https://vcgit.hhi.fraunhofer.de/jvet/VVCSoftware_VTM/-/tags/VTM-5.0, May 7, 2019, pp. 1-3.

Chubach, O. et al., "CE5-related: Modified Syntax Design of ALF Clipping Parameters Signalling", JVET-O0290-v2, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-9.

Hu, N. et al., "Non-CE5: Modification of Clipping Value Signalling for Adaptive Loop Filter", JVET-O0064-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-9.

Lim S., et al., "Non-CE5: Simplification on ALF clipping parameter coding," Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0058-v1, pp. 1-7.

Wan W., et al., "AGH17: Design for signalling reshaper model," Joint Video Experts Team (JVET) of ITU-T SG 16 WP 3 and ISO/IEC JTC 1/SC 29/WG 11, 14th Meeting: Geneva, CH, 19-27 2019, JVET-N0805-v2, pp. 1-6.

* cited by examiner

CLIPPING INDICES CODING FOR ADAPTIVE LOOP FILTER IN VIDEO CODING

This application claims the benefit of U.S. Provisional Patent Application 62/859,948, filed Jun. 11, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for signaling clipping indices for adaptive loop filters (ALFs) in video coding. The techniques of this disclosure may be applied to existing video codecs, such as codecs conforming to the ITU-T H.265, High Efficiency Video Coding (HEVC) standard, or be used as a coding tool in a standard currently being developed, such as Versatile Video Coding (VVC), and to other future video coding standards.

In one example, a method of coding video data includes coding an adaptive loop filter (ALF) clipping index as one of: a fixed-length unsigned integer, a truncated binary value, a truncated unary value, or an unsigned 0-th order Exp-Golomb coded value; and applying, based on the ALF clipping index, an ALF to a block of a picture of the video data.

In another example, a device for coding video data includes a memory configured to store video data and one or more processing circuits configured to code an ALF clipping index as one of: a fixed-length unsigned integer, a truncated binary value, a truncated unary value, or an unsigned 0-th order Exp-Golomb coded value; and apply, based on the ALF clipping index, an ALF to a block of a picture of the video data.

In another example, a device for coding video data includes means for coding an ALF clipping index as one of: a fixed-length unsigned integer, a truncated binary value, a truncated unary value, or an unsigned 0-th order Exp-Golomb coded value; and means for applying, based on the ALF clipping index, an ALF to a block of a picture of the video data.

In another example, a computer-readable storage medium is encoded with instructions that, when executed, cause a programmable processor to code an ALF clipping index as one of: a fixed-length unsigned integer, a truncated binary value, a truncated unary value, or an unsigned 0-th order Exp-Golomb coded value; and apply, based on the ALF clipping index, an ALF to a block of a picture of the video data.

The details of one or more examples are set forth in the accompanying drawings and the description below. Other features, objects, and advantages will be apparent from the description, drawings, and claims.

BRIEF DESCRIPTION OF DRAWINGS

FIG. 2A is a conceptual diagram illustrating an example 5×5 diamond-shaped adaptive loop filter (ALF) support.

FIG. 2B is a conceptual diagram illustrating an example 7×7 diamond-shaped ALF support.

Figure 3:
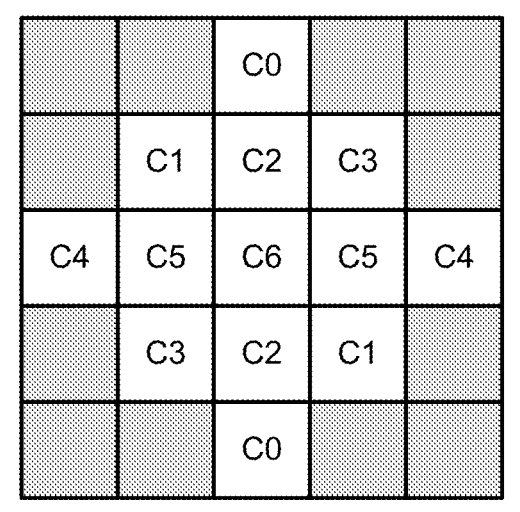

FIG. 3 is a conceptual diagram illustrating an example 5×5 diamond-shaped filter support.

DETAILED DESCRIPTION

Video encoders and video decoders may apply an adaptive loop filter (ALF) to samples of a picture in a decoded video signal. Application of an ALF may enhance the quality of a decoded video signal. During application of an ALF, a video coder (e.g., a video encoder or a video decoder) may determine a filtered value for a current sample. To determine the filtered value for the current sample, the video coder may multiply a clipped sample of an ALF filter support for the current sample by a corresponding filter coefficient. A support is a set of samples used to derive a value for a sample being filtered. The video coder may then determine the filtered value for the current sample by adding the value of the current sample to a sum the resulting multiplication products.

As noted above, the video coder multiplies clipped samples by corresponding filter coefficients. The clipping is controlled by a set of clipping values. The clipping values specify an upper limit and a lower limit on the value of the sample. The video coder may use different clipping values in different circumstances. Accordingly, a video encoder may signal an index (i.e., an ALF clipping index) of the applicable set of clipping values. For instance, the video encoder may signal the ALF clipping index in an adaptation parameter set (APS).

In VVC Test Model 5.0 (VTM-5.0) (Chen et al., "Algorithm Description for Versatile Video Coding and Test Model 5 (VTM 5)", Joint Video Experts Team (JVET) of ITU-T SG 16 WP 3 and ISO/IEC JTC 1/SC 29/WG 11, 14th Meeting: Geneva, CH, 19-27 Mar. 2019, document JVET-N1001), the ALF clipping index is signaled using an exponential-Golomb (exp-Golomb) code. Signaling the ALF clipping index as an exp-Golomb code may slow down the decoding process because determining the meaning of an exp-Golomb code may involve performing multiple comparison operations, which tend to be relatively slow.

This disclosure may address the problem. As described herein, a video coder (e.g., a video encoder or a video decoder) may code an ALF clipping index as a fixed-length unsigned integer. The video coder may apply, based on the ALF clipping index, an ALF to a block of a picture of the video data. Because the ALF clipping index is signaled as a fixed-length unsigned integer, a video decoder may be able to perform a decoding process faster.

Figure 1:
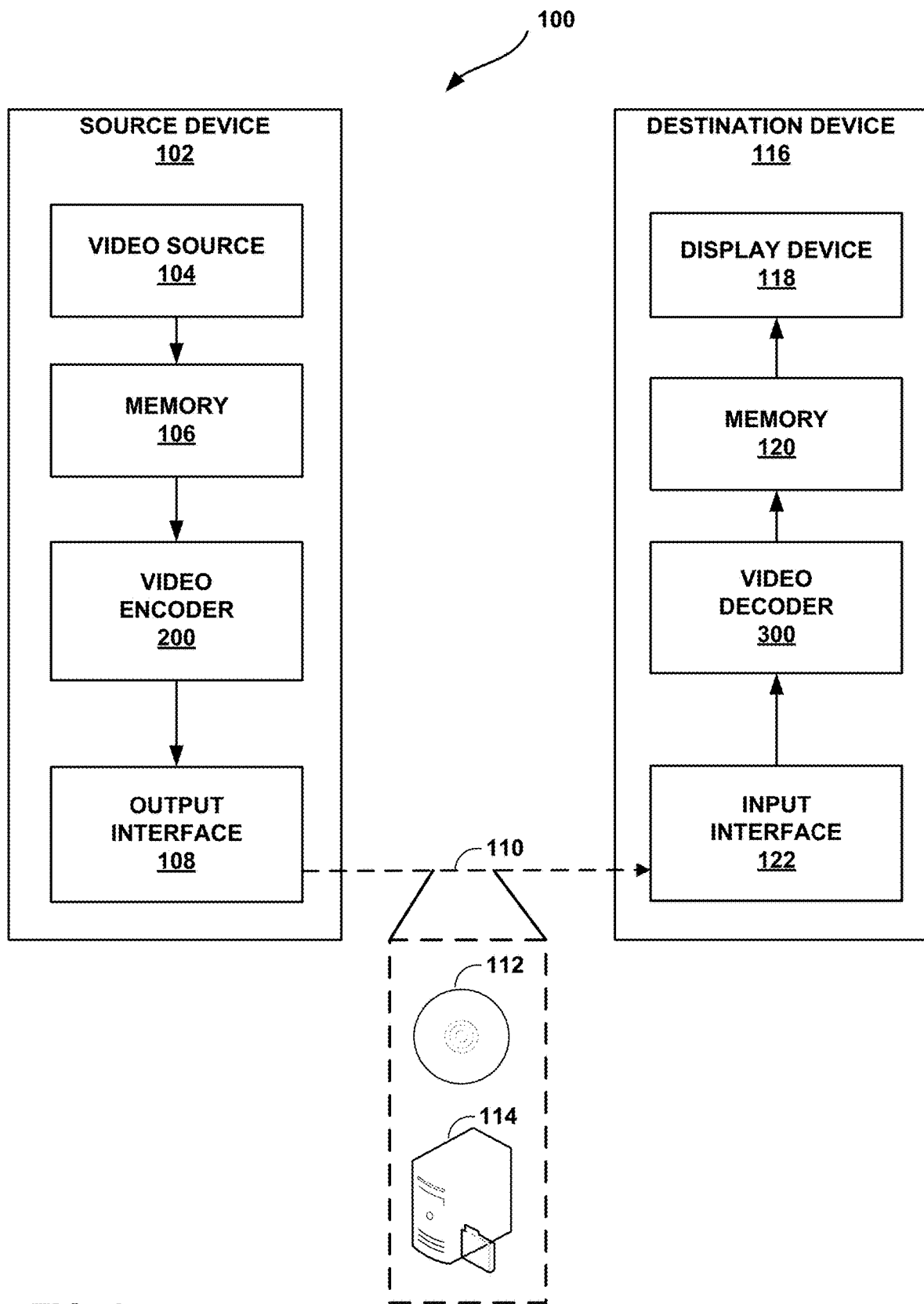
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for signaling clipping indices for adaptive loop filters in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for signaling clipping indices for adaptive loop filters in video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14' Meeting: Geneva, CH, 19-27 Mar. 2019, JVET-N1001-v3 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. A coding tree block (CTB) is N×N block of samples for some value of N such that the division of a component into CTBs is a partitioning. In VVC, a CTU may be defined as a CTB of luma samples, two corresponding CTBs of chroma samples of a picture that has three sample arrays, or a CTB of samples of a monochrome picture or a picture that is coded using three separate colour planes and syntax structures used to code the samples.

Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In the field of video coding, it is common to apply filtering in order to enhance the quality of a decoded video signal. The filter can be applied as a post-filter, where filtered frame is not used for prediction of future frames, or as an in-loop filter, where the filtered frame is used to predict a future frame. A filter can be designed, for example, by minimizing the error between the original signal and the decoded filtered signal.

In VVC Test Model 5.0 (VTM-5.0) (Chen et al., "Algorithm Description for Versatile Video Coding and Test Model 5 (VTM 5)", Joint Video Experts Team (JVET) of ITU-T SG 16 WP 3 and ISO/IEC JTC 1/SC 29/WG 11, 14th Meeting: Geneva, CH, 19-27 Mar. 2019, document JVET-N1001), the decoded filter coefficients f(k,l) and clipping values c(k,l) are applied to the reconstructed image R(i,j) as follows:

$$\tilde{R}(i,j) = R(i,j) + \Sigma_{k,l=(-K,-K), k, l=(0,0)}^{K,K} f(k,l) * \text{clip3}(-c(k,l), c(k,l), R(i+k, j+l) - R(i,j)) \quad (1)$$

Figures 2A, 2B:
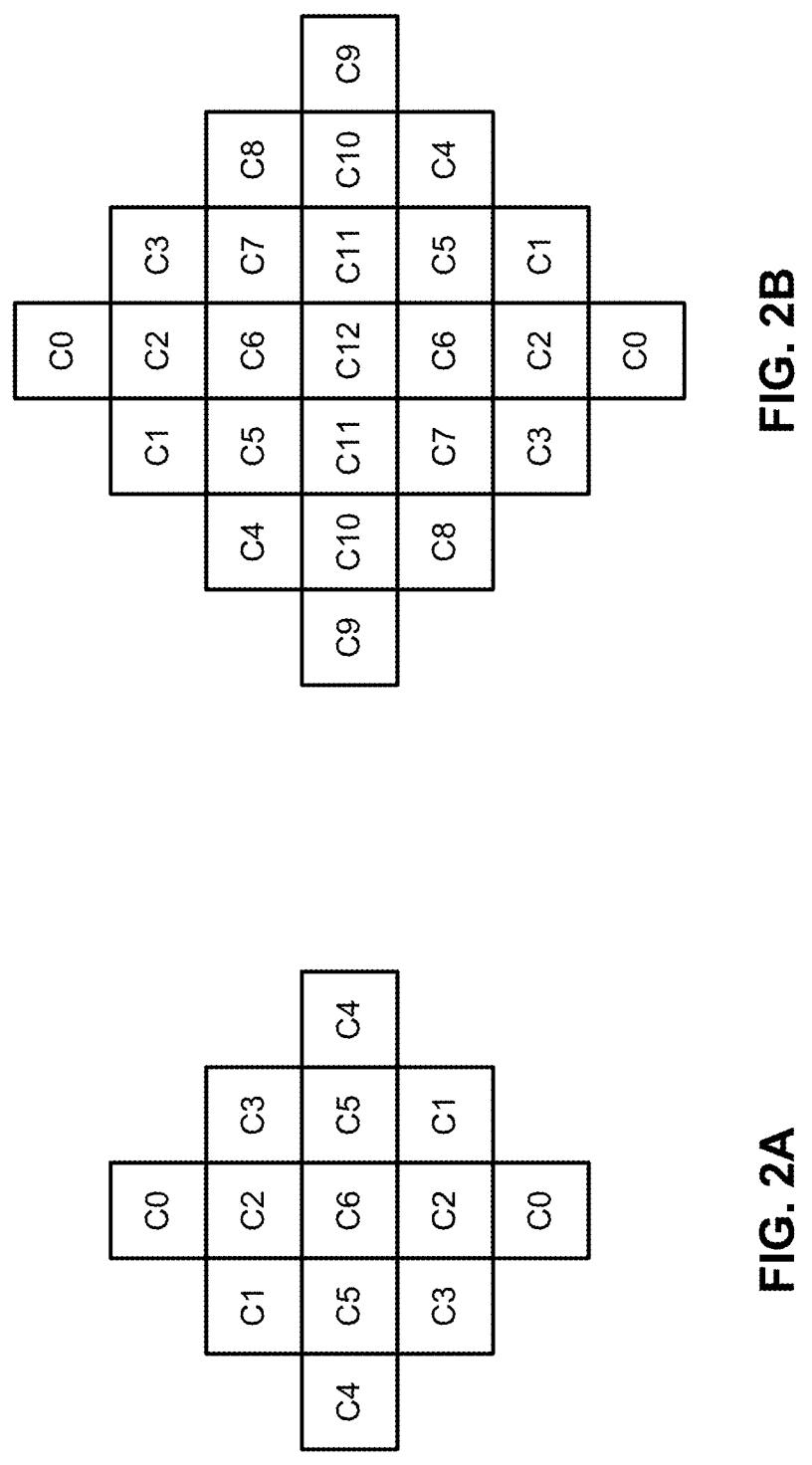

In VTM-5.0, a 7×7 filter is applied to luma components and a 5×5 filter is applied to chroma components. FIG. 2A is a conceptual diagram illustrating an example 5×5 diamond-shaped ALF support. FIG. 2B is a conceptual diagram illustrating an example 7×7 diamond-shaped ALF support. In equation (1), K may be equal to L/2, where L denotes filter length. Furthermore, in equation (1) and elsewhere in this disclosure, the clip3 function may be defined as:

$$\text{Clip3}(x, y, z) = \begin{cases} x; & z < x \\ y; & z > y \\ z; & \text{otherwise} \end{cases}$$

In equation (1), and elsewhere in this disclosure, a clipping value c(k,l) may be calculated as follows. For the luma component, a clipping value c(k,l) may be calculated as:

$$c(k,l) = \text{Round}(2^{(BitDepthY*(4-clipIdx(k,l))/4)}) \quad (1')$$

In equation (1'), BitDepthY is the bit depth for the luma component and clipIdx(k,l) is a clipping index for position (k,l). clipIdx(k,l) can be 0, 1, 2 or 3.

For the chroma component, a clipping value c(k,l) may be calculated as:

$$c(k,l) = \text{Round}(2^{(BitDepthC-8)} * 2^{(8*(3-clipIdx[k,l])/3)}) \quad (1'')$$

In equation (1"), BitDepthC is the bit depth for the chroma component and clipIdx(k,l) is a clipping value for position (k,l). clipIdx(k,l) can be 0, 1, 2 or 3.

For the luma component, 4×4 blocks in the whole picture are classified based on a 1-dimensional (1D) Laplacian direction (up to 5 directions) and 2D Laplacian activity (up to 5 activity values). The calculation of direction $\text{Dir}_b$ and unquanitzed activity $\text{Act}_b$. $\text{Act}_b$ is further quantized to the range of 0 to 4 inclusively.

Firstly, a video coder (e.g., video encoder 200 or video decoder 300) calculates values of two diagonal gradients, in addition to the horizontal and vertical gradients used in the existing ALF, using a 1D Laplacian. As it can be seen from equations (2) to (5), below, the sum of gradients of all pixels within an 8×8 window that covers a target pixel is employed as the represented gradient of the target pixel, where R(k,l) denotes the reconstructed pixels at location (k,l) and indices i and j refer to the coordinates of the upper-left pixel in the 4×4 block. Each pixel is associated with four gradient values, with a vertical gradient denoted by $g_v$, a horizontal gradient denoted by $g_h$, a 135-degree diagonal gradient denoted by $g_{d1}$ and a 45-degree diagonal gradient denoted by $g_{d2}$.

$$g_v = \sum_{k=i-2}^{i+5} \sum_{l=j-2}^{j+5} V_{k,l}, \quad (2)$$

$$V_{k,l} = |2R(k,l) - R(k,l-1) - R(k,l+1)|,$$

when both k and l are even numbers or both k and l are not even numbers. Otherwise, 0.

$$g_h = \sum_{k=i-2}^{i+5} \sum_{l=j-2}^{j+5} H_{k,l}, \quad (3)$$

$$H_{k,l} = |2R(k,l) - R(k-1,l) - R(k+1,l)|,$$

when both k and l are even numbers or both k and l are not even numbers. Otherwise, 0.

$$g_{d1} = \sum_{k=i-2}^{i+5} \sum_{l=j-3}^{j+5} D1_{k,l}, \quad (4)$$

$$D1_{k,l} = |2R(k,l) - R(k-1,l-1) - R(k+1,l+1)|,$$

when both k and l are even numbers or both k and l are not even numbers.
Otherwise, 0.

$$g_{d2} = \sum_{k=i-2}^{i+5} \sum_{j=j-2}^{j+5} D2_{k,l}, \quad (5)$$

$$D2_{k,l} = |2R(k,l) - R(k-1,l+1) - R(k+1,l-1)|,$$

when both k and l are even numbers or both k and l are not even numbers.
Otherwise, 0.

To assign the directionality $\text{Dir}_b$, a ratio of a maximum and a minimum of the horizontal and vertical gradients (denoted by $R_{h,v}$ in equation (6), below) and the ratio of a maximum and a minimum of two diagonal gradients (denoted by $R_{d1,d2}$ in equation (7), below) are compared against each other with two thresholds $t_1$ and $t_2$.

$$R_{h,v} = g_{h,v}^{max} / g_{h,v}^{min}$$

wherein $g_{h,v}^{max} = \max(g_h, g_v), g_{h,v}^{min} = \min(g_h, g_v)$, (6)

$$R_{d0,d1} = g_{d0,d1}^{max} / g_{d0,d1}^{min}$$

wherein $g_{d0,d1}^{max} = \max(g_{d0}, g_{d1}) g_{d0,d1}^{min} = \min(g_{d0}, g_{d1})$ (7)

In equations (6) and (7), and elsewhere in this disclosure, $g_{h,v}^{max}$ denotes the maximum of the horizontal and vertical gradients; $g_{h,v}^{min}$ denotes the minimum of the horizontal and vertical gradients; $g_{d0,d1}^{max}$ denotes the maximum of the two diagonal gradients; and $g_{h,v}^{min}$ denotes the minimum of the two diagonal gradients.

By comparing the detected ratios of the horizontal/vertical and diagonal gradients, five direction modes, i.e., $Dir_b$ within the range of [0, 4] inclusive, are defined in equation (8), below. The values of $Dir_b$ and their physical meanings are described in Table 1.

$$Dir_b = \begin{cases} 0 & R_{h,v} \leq t_1 \ \&\& \ R_{d0,d1} \leq t_1 \\ 1 & R_{h,v} > t_1 \ \&\& \ R_{h,v} > R_{d0,d1} \ \&\& \ R_{h,v} > t_2 \\ 2 & R_{h,v} > t_1 \ \&\& \ R_{h,v} > R_{d0,d1} \ \&\& \ R_{h,v} \leq t_2 \\ 3 & R_{d0,d1} > t_1 \ \&\& \ R_{h,v} \leq R_{d0,d1} \ \&\& \ R_{d0,d1} > t_2 \\ 4 & R_{d0,d1} > t_1 \ \&\& \ R_{h,v} \leq R_{d0,d1} \ \&\& \ R_{d0,d1} \leq t_2 \end{cases} \quad (8)$$

TABLE 1

Values of Direction and Its Physical Meaning

| Direction values | Physical meaning |
|---|---|
| 0 | Texture |
| 1 | Strong horizontal/vertical |
| 2 | horizontal/vertical |
| 3 | strong diagonal |
| 4 | diagonal |

The video coder (e.g., video encoder 200 or video decoder 300) may calculate an activity value Act as:

$$Act = \sum_{k=i-2}^{i+5} \sum_{l=j-2}^{j+5} (V_{k,l} + H_{k,l}). \quad (9)$$

The video coder may further quantize Act to a range of 0 to 4, inclusive. The quantized value of Act is denoted as Â.

The quantization process for Act may be defined as follows:
avg_var=Clip_post(NUM_ENTRY−1, (Act*ScaleFactor)>>shift);
Â=Activity ToIndex[avg_var]
wherein NUM_ENTRY is set to 16, ScaleFactor is set to 64, shift is (4+internal coded-bitdepth), and ActivityToIndex[NUM_ENTRY]={0, 1, 2, 2, 2, 2, 2, 3, 3, 3, 3, 3, 3, 3, 3, 4}. The function Clip_post(a,b) returns the smaller value between a and b.

In total, each 4×4 luma block can be categorized by the video coder into one of 25 (5 directions×5 activity levels) classes and an index is assigned to each 4×4 block according the value of $Dir_b$ and $Act_b$ of the block. The group index may be denoted by C and set equal to $5Dir_b+$Â, wherein Â is the quantized value of $Act_b$.

Figure 4C:
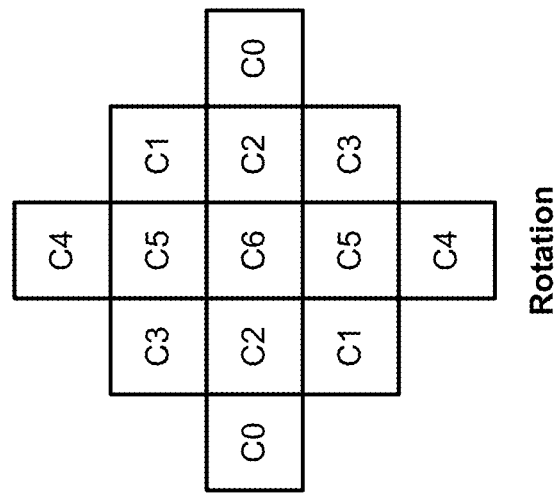
FIGS. 4A-4C are conceptual diagrams illustrating example 5×5 filter supports with different geometric transformations.
Figure 4B:
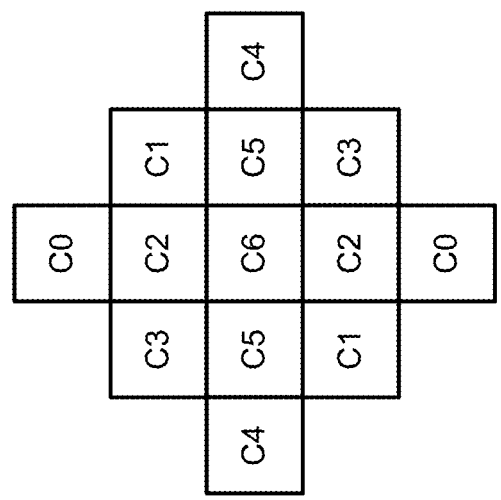
Figure 4A:
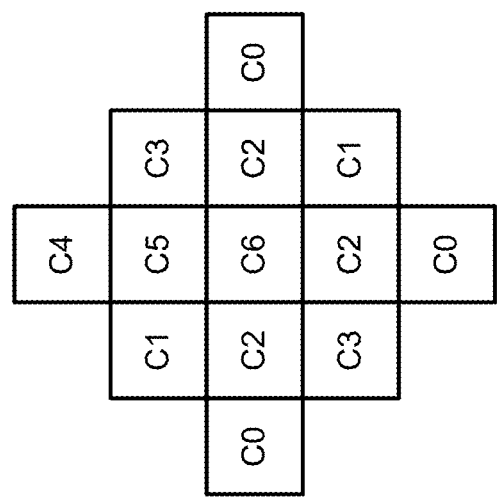

In some examples, the video coder may apply geometry transformations to filter coefficients. For instance, in some such examples, the video coder may, for each category, signal one set of filter coefficients and clipping values. To better distinguish different directions of blocks marked with the same category index, four geometry transformations, including no transformation, diagonal, vertical flip and rotation, are introduced. An example of 5×5 filter support with the three geometric transformations is depicted in FIGS. 4A-4C. In other words, FIGS. 4A-4C are conceptual diagrams illustrating example 5×5 filter supports with different geometric transformations. Comparing FIG. 3 and FIGS. 4A-4C, the formula forms of the three additional geometry transformations may be derived as:

Diagonal: $f_D(k,l)=f(l,k), c_D(k,l)=c(l,k)$,

Vertical flip: $f_V(k,l)=f(k,K-l-1), c_V(k,l)=c(k,K-l-1)$

Rotation: $f_R(k,l)=f(K-l-1,k), c_R(k,l)=c(K-l-1,k)$. (10)

In equation (10), K is the size of the filter and $0 \leq k, l \leq K-1$ are coefficient coordinates, such that location (0,0) is at the upper left corner and location (K−1, K−1) is at the lower right corner. Note that when the diamond filter support is used, such as in the ALF of VVC Draft 5, the filter coefficients with coordinates out of the filter support are always set to 0. One way of indicating the geometry transformation index is to derive the geometry transformation index implicitly to avoid additional overhead. In Geometric ALF (GALF), the transformations are applied (e.g., by a video coder such as video encoder 200 or video decoder 300) to the filter coefficients f(k,l) depending on gradient values calculated for that block. The relationship between the transformation and the four gradients calculated using Equations (2)-(5) is described in Table 2, below. To summarize, the transformations are based on which one of two gradients (horizontal and vertical, or 45-degree and 135-degree gradients) is larger. Based on the comparison, the video coder may extract more accurate direction information. Therefore, different filtering results could be obtained due to transformation while the overhead of filter coefficients is not increased.

TABLE 2

Mapping of Gradient and Transformations.

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Filter information may be signaled in a bitstream. One luma filter set contains filter information (including filter coefficients and clipping values) for all 25 classes. Fixed filters can be used to predict the filters for each class. A flag could be signaled for each class to indicate whether this class uses a fixed filter as its filter predictor. If yes (i.e., if the flag for a class indicates that the class uses a fixed filter as its filter predictor), the fixed filter information is signaled.

To reduce the number of bits required to represent the filter coefficients, different classes can be merged. The information regarding which classes are merged may be provided by sending, for each of the 25 classes, an index $i_C$. Classes having the same index $i_C$ share the same filter coefficients that are coded. The mapping between classes and filters is signaled for each luma filter set. The index $i_C$ is coded with truncated binary binarization method. A signaled filter can be predicted from a previously signaled filter.

A bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate a RBSP. The NAL unit header may include a syntax element indicating a NAL unit type code. The NAL unit type code specified by the NAL unit header of a NAL unit indicates the type of the NAL unit. An RBSP may be a syntax structure containing an integer number of bytes that is encapsulated within a NAL unit. In some instances, an RBSP includes zero bits.

As noted above, a bitstream may include a representation of encoded pictures of the video data and associated data. The associated data may include parameter sets. NAL units may encapsulate RBSPs for video parameter sets (VPSs), sequence parameter sets (SPSs), picture parameter sets (PPSs), and Adaptation Parameter Sets (APSs). A VPS is a syntax structure that includes syntax elements that apply to zero or more entire coded video sequences (CVSs). An SPS is also a syntax structure including syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure including syntax elements that apply to zero or more coded pictures. A PPS may include a syntax element that identifies an SPS that is active when the PPS is active. A slice header of a slice may include a syntax element that indicates a PPS that is active when the slice is being coded. An APS is a syntax structure containing syntax elements that apply to zero or more slices as determined by zero or more syntax elements found in slice headers. A slice header of a slice may include one or more syntax elements that indicate APSs that are active when the slice is being coded.

In VTM-5.0, APSs are used to carry ALF filter coefficients in bitstream. An APS can contain a set of luma filters or a set of chroma filters or both. A tile group, slice, or picture only signals indices of APSs that used for the current tile group in its tile group, slice, or picture header.

In VTM-5.0, filters generated from previously coded tile groups, slices, or pictures may be used for a current tile group, slice, or picture to save the overhead for filter signaling. Video encoder 200 may choose, for a luma CTB, a filter set among fixed filter sets and filter sets from APSs. Video encoder 200 may signal the chosen filter set index. All chroma CTBs use a filter from the same APS. In a tile group, slice, or picture header, video encoder 200 signals the APSs used for luma and chroma CTBs of a current tile group, slice, or picture. A tile is a rectangular region of CTBs within a particular tile column and a particular tile row in a picture.

In the video decoder of VTM-5.0 (e.g., video decoder 300), filter coefficients of the ALF are reconstructed first. Clipping indices are then decoded for non-zero filter coefficients. For filter coefficients with values of zero, the video decoder infers the clipping indices to be zero. Exponential-Golomb (i.e., Exp-Golomb) coding is used for signaling of clipping indices. The order of an Exp-Golomb code for a clipping index depends on its position in the filter template.

To be specific, in VTM-5.0, an APS may include clipping indices for the luma component that are parsed as follows, where alf_luma_clip_idx specifies a clipping index:

VVC Draft 5 provides the following semantics for the syntax elements shown in the syntax table above:

alf_luma_clip_min_eg_order_minus1 plus 1 specifies the minimum order of the exp-Golomb code for luma clipping index signalling. The value of alf_luma_clip_min_eg_order_minus1 shall be in the range of 0 to 6, inclusive.

alf_luma_clip_eg_order_increase_flag[i] equal to 1 specifies that the minimum order of the exp-Golomb code for luma clipping index signalling is incremented by 1. alf_luma_clip_eg_order_increase_flag[i] equal to 0 specifies that the minimum order of the exp-Golomb code for luma clipping index signalling is not incremented by 1.

The order kClipY[i] of the exp-Golomb code used to decode the values of alf_luma_clip_idx[sfIdx][j] is derived as follows:

$$kClipY[i]=(i==0?\text{alf\_luma\_clip\_min\_eg\_order\_minus1}+1kClipY[i-1])+ \quad (7\text{-}74)$$

alf_luma_clip_eg_order_increase_flag[i]

alf_luma_clip_idx[sfIdx][j] specifies the clipping index of the clipping value to use before multiplying by the j-th coefficient of the signalled luma filter indicated by sfIdx. When alf_luma_clip_idx[sfIdx][j] is not present, it is inferred to be equal 0 (no clipping). It is a requirement of bitstream conformance that the values of alf_luma_clip_idx[sfIdx][j] with sfIdx=0 . . . alf_luma_num_filters_signalled_minus1 and j=0 . . . 11 shall be in the range of 0 to 3, inclusive.

The order k of the exp-Golomb binarization uek(v) is derived as follows:

$$k=kClipY[\text{golombOrderIdxY}[j]] \quad (7\text{-}75)$$

The variable filterClips[sfIdx][j] with sfIdx=0 . . . alf_luma_num_filters_signalled_minus1, j=0 . . . 11 is initialized as follows:

$$\text{filterClips}[sfIdx][j]=\text{Round}(2^{(BitDepthY*(4-\text{alf\_luma\_clip\_idx}[sfIdx][j])/4)}) \quad (7\text{-}76)$$

The luma filter clipping values AlfClip$_L$[adaptation_parameter_set_id] with elements AlfClip$_L$[adaptation_parameter_set_id][filtIdx][j], with filtIdx=0 . . . NumAlfFilters−1 and j=0 . . . 11 are derived as follows:

$$\text{AlfClip}_L[\text{adaptation\_parameter\_set\_id}][\text{filtIdx}][j]=\text{filterClips}[\text{alf\_luma\_coeff\_delta\_idx}[\text{filtIdx}]][j] \quad (7\text{-}77)$$

In the syntax tables of this disclosure, u(n) indicates an unsigned integer using n bits. When the letter n in a descriptor of type u(n) is "v" in a syntax table, the number of bits varies in a manner dependent on the value of other

```
if( alf_luma_clip_flag ) {
  alf_luma_clip_min_eg_order_minus1                              ue(v)
  for( i = 0; i < 3; i++ )
    alf_luma_clip_eg_order_increase_flag[ i ]                    u(1)
  for( sfIdx = 0; sfIdx <= alf_luma_num_filters_signalled_minus1;
sfIdx++ ) {
    if( alf_luma_coeff_flag[ sfIdx ] ) {
      for ( j = 0; j < 12; j++ ) {
        if( filtCoeff[sfIdx ][ j ] )
          alf_luma_clip_idx[ sfIdx ][ j ]                        uek(v)
      }
    }
  }
}
``` syntax elements. The descriptor tb(v) indicates a truncated binary value using up to maxVal bits with maxVal defined in the semantics of the syntax element. The descriptor tu(v) indicates a truncated unary value using up to maxVal bits with maxVal defined in the semantics of the syntax element. The descriptor ue(v) indicates an unsigned integer 0-th order Exp-Golomb-coded syntax element with the left bit first. The descriptor uek(v) indicates an unsigned integer k-th order Exp-Golomb-coded syntax element with the left bit first. The descriptor se(v) indicates a signed integer 0-th order Exp-Golomb-coded syntax element with the left bit first.

VVC Draft 5 provides the following parsing process for syntax elements coded using descriptor tb(v):

This process is invoked when the descriptor of a syntax element in the syntax tables in subclause 7.3 is equal to tb(v).

Inputs to this process are bits from the RBSP and the maximum value maxVal.

Outputs of this process are syntax element values.

Syntax elements coded as tb(v) are truncated binary coded. The range of possible values for the syntax element is determined first. The range of this syntax element is 0 to maxVal, inclusive, with maxVal being greater than or equal to 1. synVal which is equal to the value of the syntax element is given by a process specified as follows:

```
thVal = 1
th = −1
while( thVal <= maxVal ) {
  th++
  thVal <<= 1
}
val = 1 << th                              (9-4)
b = maxVal − val
synVal = read_bits( th )
if( synVal >= val − b ) {
  synVal <<= 1
  synVal += read_bits( 1 )
  synVal −= val − b
}
``` where the value returned from read_bits(th) is interpreted as a binary representation of an unsigned integer with most significant bit written first.

VVC Draft 5 provides the following parsing process for syntax elements coded using descriptor tu(v):

This process is invoked when the descriptor of a syntax element in the syntax tables in subclause 7.3 is equal to tu(v).

Inputs to this process are bits from the RBSP and the maximum value maxVal.

Outputs of this process are syntax element values.

Syntax elements coded as tu(v) are truncated unary coded. The range of possible values for the syntax element is determined first. The range of this syntax element is 0 to maxVal inclusive, with maxVal being greater than or equal to 1. codeNum which is equal to the value of the syntax element is given by a process specified as follows:

```
codeNum = 0
keepGoing = 1
for( i = 0; i < maxVal && keepGoing; i++ ) {
  keepGoing = read_bits( 1 )                  (9-3)
  if( keepGoing )
    codeNum ++
}
```

VVC Draft 5 provides the following parsing process for syntax elements coded using descriptors ue(v)uek(v), and se(v):

This process is invoked when the descriptor of a syntax element in the syntax tables is equal to ue(v), uek(v) or se(v).

Inputs to this process are bits from the RBSP.

Outputs of this process are syntax element values.

Syntax elements coded as ue(v) or se(v) are Exp-Golomb-coded with order k equal to 0 and syntax elements coded as uek(v) are Exp-Golomb-coded with order k. The parsing process for these syntax elements begins with reading the bits starting at the current location in the bitstream up to and including the first non-zero bit, and counting the number of leading bits that are equal to 0. This process is specified as follows:

```
leadingZeroBits = −1
for( b = 0; !b; leadingZeroBits++ )         (9-1)
  b = read_bits( 1 )
```

The variable codeNum is then assigned as follows:

$$\text{codeNum} = (2^{leadingZeroBits} - 1) * 2^k + \text{read\_bits}(leadingZeroBits + k) \quad (9\text{-}2)$$

where the value returned from read_bits(leadingZeroBits) is interpreted as a binary representation of an unsigned integer with most significant bit written first.

Table 9-1 illustrates the structure of the 0-th order Exp-Golomb code by separating the bit string into "prefix" and "suffix" bits. The "prefix" bits are those bits that are parsed as specified above for the computation of leadingZeroBits, and are shown as either 0 or 1 in the bit string column of Table 9-1. The "suffix" bits are those bits that are parsed in the computation of codeNum and are shown as $x_i$ in Table 9-1, with i in the range of 0 to leadingZeroBits−1, inclusive. Each $x_i$ is equal to either 0 or 1.

TABLE 9-1

Bit strings with "prefix" and "suffix" bits and assignment to codeNum ranges (informative)

| Bit string form | Range of codeNum |
| --- | --- |
| 1 | 0 |
| 0 1 $x_0$ | 1..2 |
| 0 0 1 $x_1$ $x_0$ | 3..6 |
| 0 0 0 1 $x_2$ $x_1$ $x_0$ | 7..14 |
| 0 0 0 0 1 $x_3$ $x_2$ $x_1$ $x_0$ | 15..30 |
| 0 0 0 0 0 1 $x_4$ $x_3$ $x_2$ $x_1$ $x_0$ | 31..62 |
| . . . | . . . |

Table 9-2 illustrates explicitly the assignment of bit strings to codeNum values.

TABLE 9-2

Exp-Golomb bit strings and codeNum in explicit form and used as ue(v) (informative)

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

Depending on the descriptor, the value of a syntax element is derived as follows:

If the syntax element is coded as ue(v), the value of the syntax element is equal to codeNum.

Otherwise (the syntax element is coded as se(v)), the value of the syntax element is derived by invoking the mapping process for signed Exp-Golomb codes as specified in clause 9.2.2 with codeNum as input.

9.2.2 Mapping Process for Signed Exp-Golomb Codes

Input to this process is codeNum as specified in clause 9.2.

Output of this process is a value of a syntax element coded as se(v).

The syntax element is assigned to the codeNum by ordering the syntax element by its absolute value in increasing order and representing the positive value for a given absolute value with the lower codeNum. Table 9-3 provides the assignment rule.

TABLE 9-3

Assignment of syntax element to codeNum for signed Exp-Golomb coded syntax elements se(v)

| codeNum | syntax element value |
|---|---|
| 0 | 0 |
| 1 | 1 |
| 2 | −1 |
| 3 | 2 |
| 4 | −2 |
| 5 | 3 |
| 6 | −3 |
| k | $(-1)^{k+1}\text{Ceil}(k \div 2)$ |

In VVC Draft 5, clipping indices for chroma components are parsed as follows:

```
if( alf_chroma_clip_flag ) {
  alf_chroma_clip_min_eg_order_minus1                      ue(v)
  for( i = 0; i < 2; i++ )
    alf_chroma_clip_eg_order_increase_flag[ i ]            u(1)
  for( j = 0; j < 6; j++ ) {
    if( alf_chroma_coeff_abs[ j ])
      alf_chroma_clip_idx[ j ]                             uek(v)
  }
}
```

VVC Draft 5 provides the following semantics for the syntax elements shown in the syntax table above:

alf_chroma_clip_flag equal to 0 specifies that linear adaptive loop filtering is applied on chroma components; alf_chroma_clip_flag equal to 1 specifies that non-linear adaptive loop filtering is applied on chroma component. When not present, alf_chroma_clip_flag is inferred to be equal to 0.

alf_chroma_min_eg_order_minus1 plus 1 specifies the minimum order of the exp-Golomb code for chroma filter coefficient signalling. The value of alf_chroma_min_eg_order_minus1 shall be in the range of 0 to 6, inclusive.

alf_chroma_eg_order_increase_flag[i] equal to 1 specifies that the minimum order of the exp-Golomb code for chroma filter coefficient signalling is incremented by 1. alf_chroma_eg_order_increase_flag[i] equal to 0 specifies that the minimum order of the exp-Golomb code for chroma filter coefficient signalling is not incremented by 1

The order expGoOrderC[i] of the exp-Golomb code used to decode the values of alf_chroma_coeff_abs[j] is derived as follows:

$$\text{expGoOrder}C[i] = (i == 0?\text{alf\_chroma\_min\_eg\_order\_minus1+1 expGoOrder}C[i-1])+ \quad (7\text{-}78)$$

$$\text{alf\_chroma\_eg\_order\_increase\_flag}[i] \quad (7\text{-}79)$$

alf_chroma_coeff_abs[j] specifies the absolute value of the j-th chroma filter coefficient. When alf_chroma_coeff_abs[j] is not present, it is inferred to be equal 0. It is a requirement of bitstream conformance that the values of alf_chroma_coeff_abs[j] shall be in the range of 0 to $2^7$-1, inclusive.

The order k of the exp-Golomb binarization uek(v) is derived as follows:

$$\text{golombOrderIdx}C[i] = \{\mathbf{0,0,1,0,0,1}\} \quad (7\text{-}80)$$

$$k = \text{expGoOrder}C[\text{golombOrderIdx}C[j]] \quad (7\text{-}81)$$

alf_chroma_coeff_sign[j] specifies the sign of the j-th chroma filter coefficient as follows:

If alf_chroma_coeff_sign[j] is equal to 0, the corresponding chroma filter coefficient has a positive value.

Otherwise (alf_chroma_coeff_sign[j] is equal to 1), the corresponding chroma filter coefficient has a negative value.

When alf_chroma_coeff_sign[j] is not present, it is inferred to be equal to 0.

The chroma filter coefficients AlfCoeff$_C$[adaptation_parameter_set_id] with elements AlfCoeff$_C$[adaptation_parameter_set_id][j], with j=0 . . . 5 are derived as follows:

$$\text{AlfCoeff}_C[\text{adaptation\_parameter\_set\_id}][j] = \text{alf\_chroma\_coeff\_abs}[j]^* \quad (7\text{-}82)$$

(1−2*alf_chroma_coeff_sign[j])

It is a requirement of bitstream conformance that the values of AlfCoeff$_C$[adaptation_parameter_set_id][j] with j=0 . . . 5 shall be in the range of $-2^7-1$ to $2^7-1$, inclusive.

alf_chroma_clip_min_eg_order_minus1 plus 1 specifies the minimum order of the exp-Golomb code for chroma clipping index signalling. The value of alf_chroma_clip_min_eg_order_minus1 shall be in the range of 0 to 6, inclusive.

alf_chroma_clip_eg_order_increase_flag[i] equal to 1 specifies that the minimum order of the exp-Golomb code for chroma clipping index signalling is incremented by 1. alf_chroma_clip_eg_order_increase_flag[i] equal to 0 specifies that the minimum order of the exp-Golomb code for chroma clipping index signalling is not incremented by 1.

The order expGoOrderC[i] of the exp-Golomb code used to decode the values of alf_chroma_clip_idx[j] is derived as follows:

$$kClipC[i]=(i==0?alf\_chroma\_clip\_min\_eg\_order\_minus1+1: kClipC[i-1])+ \quad (7\text{-}83)$$

$$alf\_chroma\_clip\_eg\_order\_increase\_flag[i] \quad (7\text{-}84)$$

alf_chroma_clip_idx[j] specifies the clipping index of the clipping value to use before multiplying by the j-th coefficient of the chroma filter. When alf_chroma_clip_idx[j] is not present, it is inferred to be equal 0 (no clipping).

It is a requirement of bitstream conformance that the values of alf_chroma_clip_idx[j] with j=0 . . . 5 shall be in the range of 0 to 3, inclusive.

The order k of the exp-Golomb binarization uek(v) is derived as follows:

$$k=kClipC[golombOrderIdxC[j]] \quad (7\text{-}85)$$

The chroma filter clipping values AlfClip$_C$[adaptation_parameter_set_id] with elements AlfClip$_C$[adaptation_parameter_set_id][j], with j=0 . . . 5 are derived as follows:

$$AlfClip_C[adaptation\_parameter\_set\_id][j]=Round(2^{(BitDepthC-8)*2^{(8*(3-alf\_chroma\_clip\_idx[j])/3)}}) \quad (7\text{-}86)$$

As described above, to parse clipping indices, filter coefficients are reconstructed first. In addition, recursive exp-Golomb coding is used for parsing clipping indices. Reconstructing the filter coefficients first and using recursive exp-Golomb coding may increase the delay in video decoder 300.

Aspects of this disclosure describe examples that may simplify the parsing of clipping indices for both luma and chroma components. The aspects and examples of this disclosure may be used separately, or in combination. Aspects of this disclosure may decrease the delay in video decoder 300 and, in some examples, the decoding path of video encoder 200.

In a first aspect of this disclosure, a clipping index clipIdx(k,l) is always signaled/parsed (e.g., by video encoder 200 or video decoder 300, respectively) even if the corresponding filter coefficient f(k,l) is zero. In other words, the condition that the corresponding filter coefficient is non-zero may be removed. For instance, with reference to the syntax tables above, the lines "if(filtCoeff[sfIdx][j])" and "if (alf_chroma_coeff_abs[j])" may be removed. In this way, a video coder (e.g., video encoder 200 or video decoder 300) may code the ALF clipping index regardless of a value of a corresponding filter coefficient of the ALF. For instance, the video coder may determine that the corresponding filter coefficient is equal to 0 and still code (e.g., encode or decode) the ALF clipping index.

In a second aspect of this disclosure, the recursive exp-Golomb coding is removed. For instance, in one example of the second aspect of this disclosure, fixed-length coding may be used to signal clipping indices, letting x be the length of each code word, as shown in the syntax tables below.

| | |
|---|---|
| if( alf_luma_clip_flag ) { | |
|   for( sfIdx = 0; sfIdx <= alf_luma_num_filters_signalled_minus1; sfIdx++ ) { | |
|     for ( j = 0; j < 12; j++ ) { | |
|       alf_luma_clip_idx [ sfIdx ][ j ] | u(x) |
|     } | |
|   } | |
| } | |
| if( alf_chroma_clip_flag ) { | |
|   for( j = 0; j < 6; j++ ) { | |
|     alf_chroma_clip_idx[ j ] | u(x) |
|   } | |
| } | |

In contrast to VVC Draft 5, in which alf_luma_clip_idx and alf_chroma_clip_idx have descriptors uek(v) (denoting unsigned integer k-th order Exp-Golomb coding), alf_luma_clip_idx and alf_chroma_clip_idx have descriptors u(x) in this example (denoting an unsigned integer using x bits). The syntax tables of this example may form part of a syntax table of an APS.

Thus, in this example, a video coder (e.g., video encoder 200 or video decoder 300) may code an ALF clipping index as a fixed-length unsigned integer. Furthermore, the video coder may apply, based on the ALF clipping index, an ALF to a block of a picture of the video data.

In some examples of the second aspect of this disclosure, truncated binary coding may be used to signal clipping indices. For instance, alf_luma_clip_idx and/or alf_chroma_clip_idx may have descriptors tb(v).

In some examples of the second aspect of this disclosure, 0-order Golomb may be used to signal clipping indices. For instance, alf_luma_clip_idx and/or alf_chroma_clip_idx may have descriptors ue(v).

In some examples of the second aspect of this disclosure, x-order Golomb may be used to signal clipping indices, where x is the order of Golomb coding. In some such examples, x may depend on the component. In other words, there may be different values of x for luma and chroma components. x may be the same for all clipping indices in one or multiple components. In other examples, x may depend on the filter indices and x may be the same for all clipping indices in one or multiple filters.

In some examples of the second aspect of this disclosure, truncated unary coding may be used to signal clipping indices. For instance, alf_luma_clip_idx and/or alf_chroma_clip_idx may have descriptors tu(v).

In some examples of the second aspect of this disclosure, the coding method may be different among color components. For instance, alf_luma_clip_idx and alf_chroma_clip_idx may be coded using different ones of truncated binary, truncated unit, unsigned integer using n bits, unsigned integer 0-th order Exp-Golomb coding, and unsigned integer k-th order Exp-Golomb coding.

Thus, a video coder (e.g., video encoder 200 or video decoder 300) may code (e.g., encode or decode) an ALF clipping index as one of: a fixed-length unsigned integer (descriptor u(x)), a truncated binary value (descriptor tb(v)), a truncated unary value (descriptor tu(v)), or an unsigned 0-th order Exp-Golomb coded value (descriptor (ue(v)). The video coder may apply, based on the ALF clipping index, an ALF to a block of a picture of the video data. The video coder may perform this for either or both luma and chroma components. Thus, the ALF clipping index may be a luma ALF clipping index or a chroma ALF clipping index. With respect to the first aspect of this disclosure, the video coder may code the ALF clipping index regardless of a value of a corresponding filter coefficient of the ALF.

In some examples, to apply the ALF based on the ALF clipping index, the video coder may determine a clipping value based on the clipping index as indicated in equation (1') or (1"), as set forth above. The video coder may then use the clipping value in equation (1), as set forth above. The video coder may determine the filter coefficients as set forth elsewhere in this disclosure, or in other ways.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 5A:
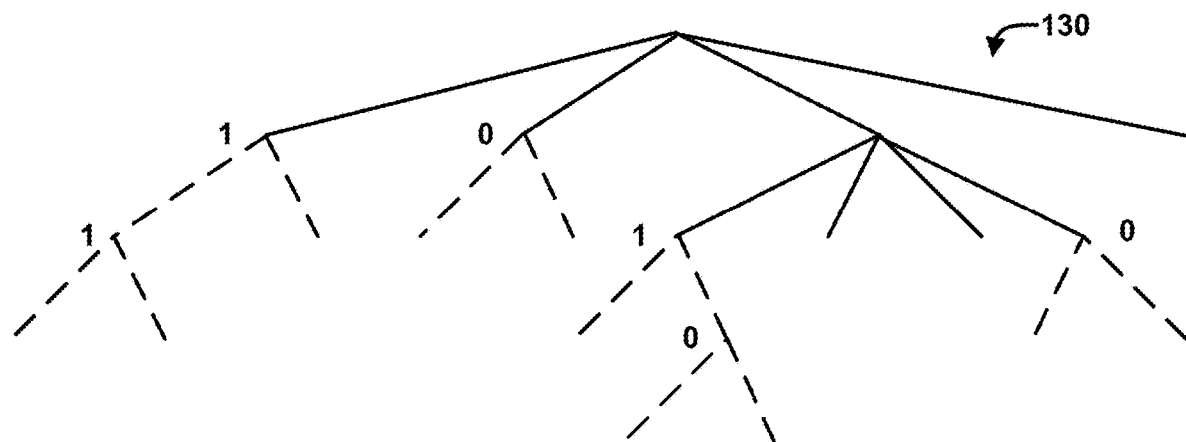
FIGS. 5A and 5B are conceptual diagrams illustrating an example quadtree binary tree (QTBT) structure, and a corresponding coding tree unit (CTU).
Figure 5B:
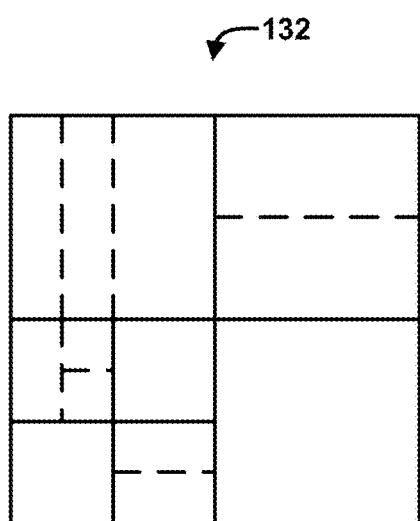

FIGS. 5A and 5B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level (i.e., the first level) of QTBT structure 130 (i.e., the solid lines) and syntax elements (such as splitting information) for a prediction tree level (i.e., the second level) of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 5B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, it will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs, and are further processed according to prediction and transform without further partitioning.

Figure 6:
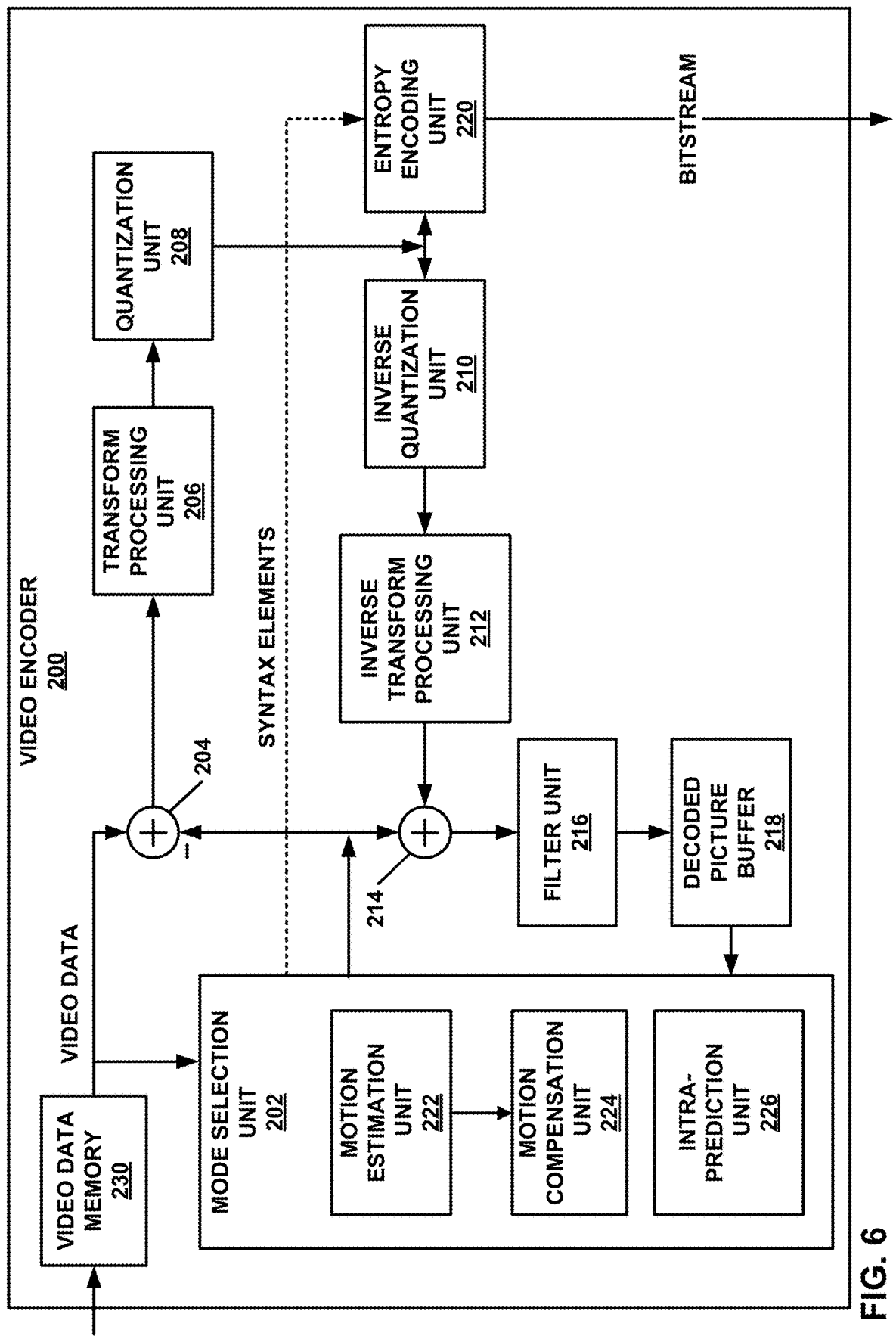
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 in the context of video coding standards such as the H.265 (HEVC) video coding standard and the H.266 (VVC) video coding standard in development. However, the techniques of this disclosure are not limited to these video coding standards, and are applicable generally to video encoding and decoding.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. In accordance with an example of this disclosure, filter unit 216 may apply, based on an ALF clipping index coded as a fixed-length unsigned integer, an ALF to a block of a picture of the video data.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to encode an ALF clipping index as one of: a fixed-length unsigned integer, a truncated binary value, a truncated unary value, or an unsigned 0-th order Exp-Golomb coded value. In other words, video encoder 200 may include, in a bitstream that includes an encoded representation of video data, an ALF clipping index syntax element, where the ALF clipping index syntax element is formatted as one of these types of data. In some examples, the ALF clipping index is a luma ALF clipping index (e.g., alf_luma_clip_idx or another syntax element) or a chroma ALF clipping index (e.g., alf_chroma_clip_idx or another syntax element). Additionally, the processing units of video encoder 200 may apply, based on the ALF clipping index, an ALF to a block of a picture of the video data. For instance, filter unit 216 of video encoder 200 may apply the ALF.

Figure 7:
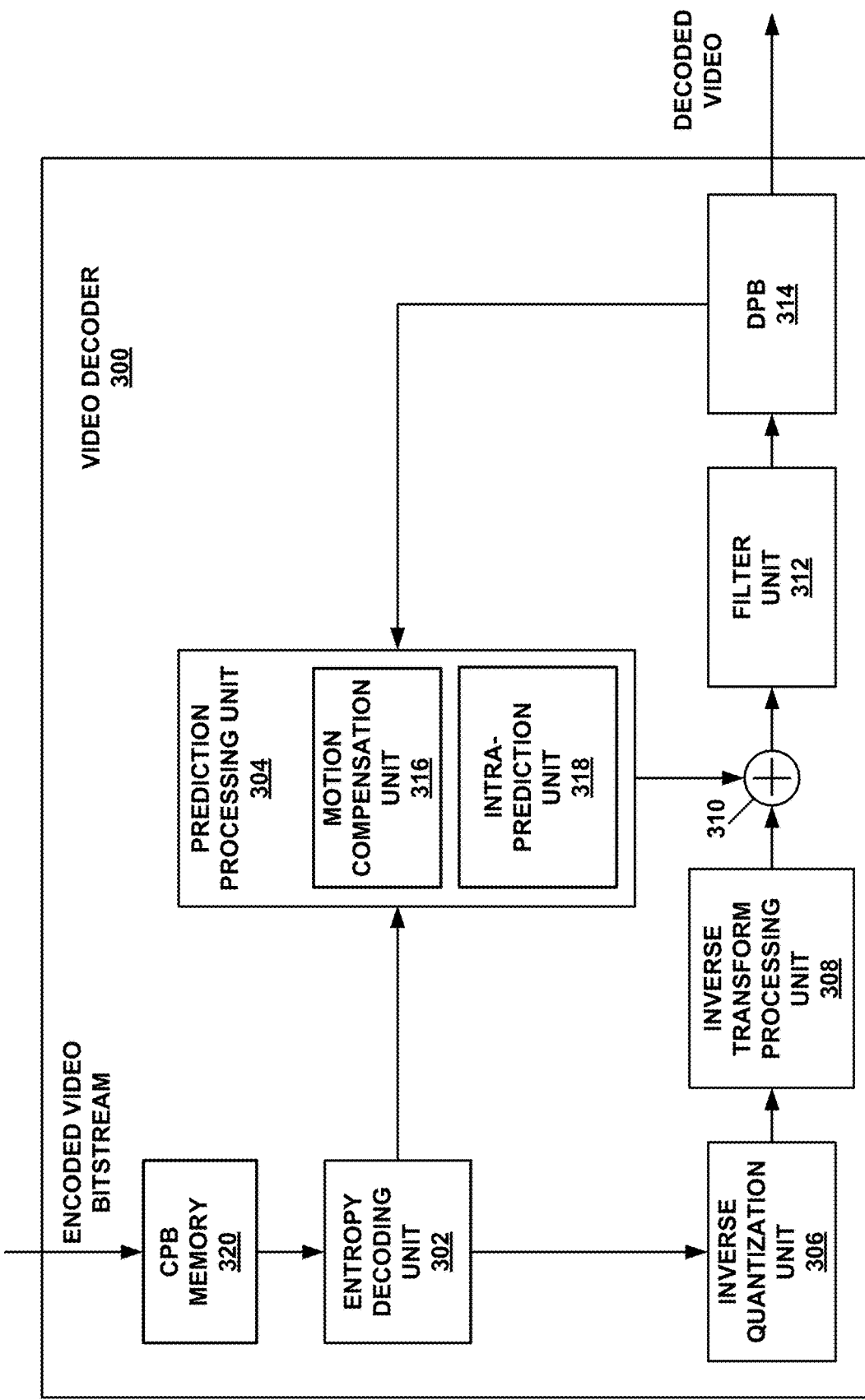
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of VVC, and HEVC. However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette coding unit, an intra-block copy coding unit (which may form part of motion compensation unit 316), an affine coding unit, a linear model (LM) coding unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. In accordance with an example of this disclosure, filter unit 312 may apply, based on an ALF clipping index coded as a fixed-length unsigned integer, an ALF to a block of a picture of the video data.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to decode an ALF clipping index as one of: a fixed-length unsigned integer, a truncated binary value, a truncated unary value, or an unsigned 0-th order Exp-Golomb coded value. In other words, video decoder 300 may obtain an ALF clipping index syntax element from a bitstream and interpret the ALF clipping index syntax element as one of these types of data. In some examples, the ALF clipping index is a luma ALF clipping index (e.g., alf_luma_clip_idx or another syntax element) or a chroma ALF clipping index (e.g., alf_chroma_clip_idx or another syntax element). Additionally, the processing units of video decoder 300 may apply, based on the ALF clipping index, an ALF to a block of a picture of the video data. For instance, filter unit 312 of video decoder 300 may apply the ALF.

Figure 8:
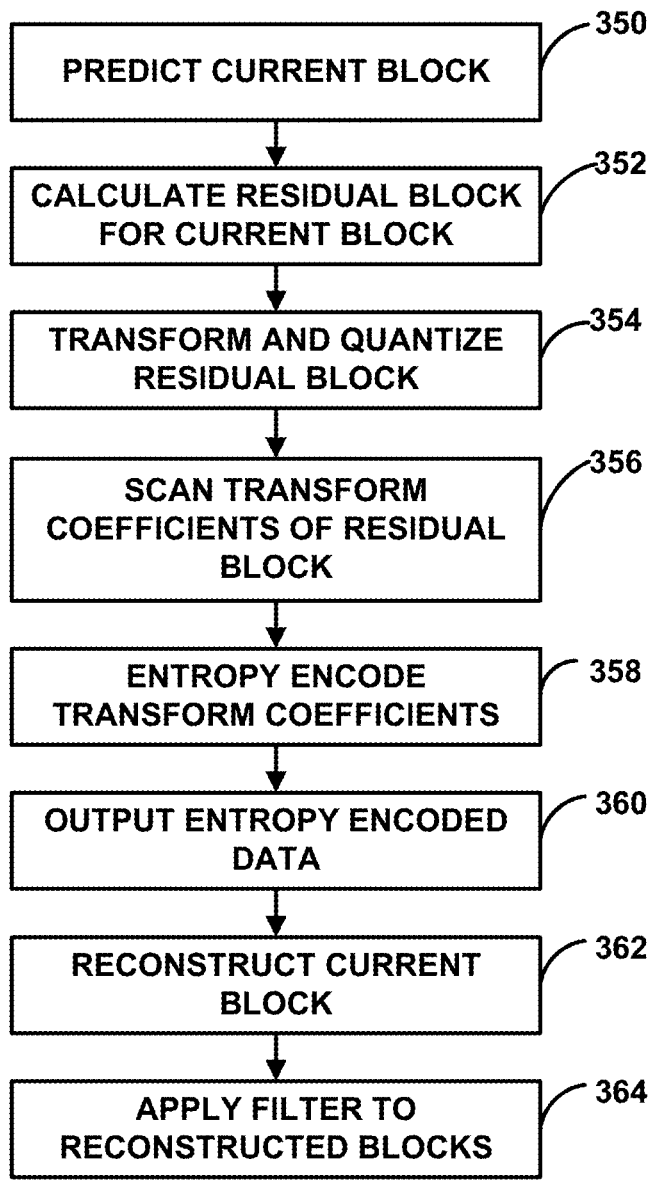
FIG. 8 is a flowchart illustrating an example method for encoding a current block of a current picture of video data.

FIG. 8 is a flowchart illustrating an example method for encoding a current block. The current block may comprise a current CU. Although described with respect to video encoder 200 (FIGS. 1 and 6), it should be understood that other devices may be configured to perform a method similar to that of FIG. 8.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Additionally, in the example of FIG. 8, to support prediction of subsequent blocks, video encoder 200 may reconstruct the current block (362). For instance, video encoder 200 may inverse quantize transform coefficients of the current block, apply an inverse transform to the transform coefficients to generate residual data, and add the residual data for the current block to the prediction block of the current block. Additionally, video encoder 200 may apply one or more filters to reconstructed blocks of the current picture (364). For instance, video encoder 200 may apply an ALF to reconstructed blocks of the current picture. In accordance with a technique of this disclosure, to support corresponding application of the ALF at video decoder 300, video encoder 200 may encode an ALF clipping index. Video encoder 200 (e.g., filter unit 216 of video encoder 200) may apply, based on the ALF clipping index, an ALF to a block (e.g., a reconstructed block) of the current picture. In accordance with a technique of this disclosure, video encoder 200 may encode the ALF clipping index as a fixed-length unsigned integer, a truncated binary value, a truncated unary value, or an unsigned 0-th order Exp-Golomb coded value.

Figure 9:
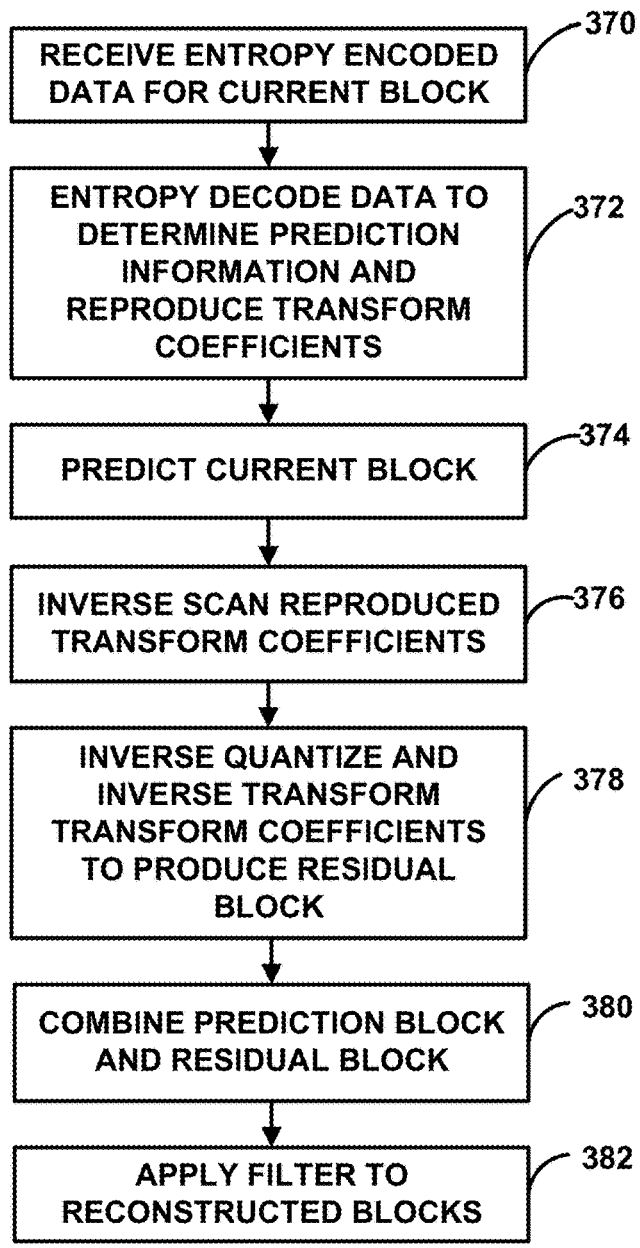
FIG. 9 is a flowchart illustrating an example method for decoding a current block of a current picture of video data.

FIG. 9 is a flowchart illustrating an example method for decoding a current block of a current picture of video data. The current block may comprise a current CU. Although described with respect to video decoder 300 (FIGS. 1 and 7), it should be understood that other devices may be configured to perform a method similar to that of FIG. 9.

Video decoder 300 may receive entropy encoded data for the current block, such as entropy encoded prediction information and entropy encoded data for transform coefficients of a residual block corresponding to the current block (370). Video decoder 300 may also receive non-entropy encoded data in a bitstream. Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 (e.g., inverse quantization unit 306 and inverse transform processing unit 308) may then inverse quantize and inverse transform the transform coefficients to produce a residual block (378). Video decoder 300 may decode the current block by combining the prediction block and the residual block (380).

Additionally, in the example of FIG. 9, after combining the prediction block and the residual block to reconstruct the current block, video decoder 300 (e.g., filter unit 312 of video decoder 300) may apply one or more filters to reconstructed blocks of the current picture (382). For instance, video decoder 300 may apply an ALF to reconstructed blocks of the current picture. Video decoder 300 may decode an ALF clipping index and apply, based on the ALF clipping index, an ALF to a block (e.g., a reconstructed block) of the current picture. In accordance with a technique of this disclosure, video decoder 300 may decode the ALF clipping index as a fixed-length unsigned integer, a truncated binary value, a truncated unary value, or an unsigned 0-th order Exp-Golomb coded value.

Figure 10:
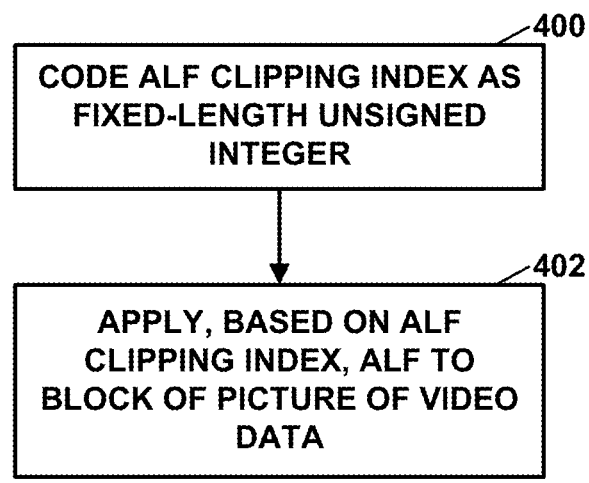
FIG. 10 is a flowchart illustrating an example operation for coding video data in accordance with one or more techniques of this disclosure.

FIG. 10 is a flowchart illustrating an example operation for coding video data in accordance with one or more techniques of this disclosure. In the example of FIG. 10, a video coder (e.g., video encoder 200 or video decoder 300) may code (e.g., encode or decode) an Adaptive Loop Filter (ALF) clipping index as a fixed-length unsigned integer (400). For example, when the video coder is a video encoder such as video encoder 200, the video encoder may encode the ALF clipping index by including a fixed-length unsigned integer representing the ALF clipping index in a bitstream. In an example where the video coder is a video decoder such as video decoder 300, the video decoder may decode the ALF clipping index by parsing the fixed-length unsigned integer representing the ALF clipping index from the bitstream.

Furthermore, in the example of FIG. 10, the video coder may apply, based on the ALF clipping index, an ALF to a block of a picture of the video data (402). For example, the video coder may use the ALF clipping index to look up or calculate a set of clipping values (e.g., $-c(k,l)$ and $c(k,l)$), e.g., using equation (1') or equation (1"), above. The video coder may then use the set of clipping values in applying an ALF to reconstructed samples of the block (e.g., as shown in equation (1), above). The video coder may apply the ALF as part of action 364 of FIG. 8 or action 382 of FIG. 9. The ALF clipping index may be a luma ALF clipping index (e.g., alf_luma_clip_idx), in which case the video coder uses the luma ALF clipping index to determine clipping values for use in applying an ALF to luma samples. In some examples, the ALF clipping index is a luma ALF clipping index, in which case the video coder uses the luma ALF clipping index (e.g., alf_chroma_clip_idx) to determine clipping values for use in applying an ALF to luma samples. Applying an ALF to a block (e.g., a 4×4 block) of a picture may including determining ALF filter coefficients for the block, using the ALF clipping index to determine clipping values for at least one sample of the block, and using the clipping values and ALF filter coefficients, e.g., as described in equation (1).

Furthermore, in some examples, the video coder may code a luma ALF clipping index as a first fixed-length unsigned integer and may code a chroma ALF clipping index as a second fixed-length unsigned integer. In such examples, the video coder may apply, based on the luma ALF clipping index, an ALF to a luma block of the picture and may apply, based on the chroma ALF clipping index, an ALF to a chroma block of the picture.

The following is a non-limiting list of examples that are in accordance with one or more techniques of this disclosure.

Example 1. A method of coding video data, the method including: coding an Adaptive Loop Filter (ALF) clipping index as one of: a fixed-length unsigned integer, a truncated binary value, a truncated unary value, or an unsigned 0-th order Exp-Golomb coded value; and applying, based on the ALF clipping index, an ALF filter to a block of a picture of the video data.

Example 2. The method of example 1, wherein the ALF clipping index is a luma ALF clipping index.

Example 3. The method of example 1, wherein the ALF clipping index is a chroma ALF clipping index.

Example 4. The method of example 1, wherein: the ALF clipping index is a luma ALF clipping index and the block of the picture is a luma block, and the method further comprises: coding a chroma ALF clipping index as one of: a fixed-length unsigned integer, a truncated binary value, a truncated unary value, or an unsigned 0-th order Exp-Golomb coded value; and applying, based on the ALF clipping index, an ALF filter to a chroma block of a picture of the video data.

Example 5. The method of example 4, wherein the luma ALF clipping index and the chroma ALF clipping index are coded as different ones of a fixed-length unsigned integer, a truncated binary value, a truncated unary value, or an unsigned 0-th order Exp-Golomb coded value.

Example 6. The method of any of examples 1-5, wherein coding the ALF clipping index comprises coding the ALF clipping index regardless of a value of a corresponding filter coefficient of the ALF filter.

Example 7. The method of any of examples 1-6, wherein coding comprises decoding.

Example 8. The method of any of examples 1-6, wherein coding comprises encoding.

Example 9. A device for coding video data, the device including one or more means for performing the method of any of examples 1-8.

Example 10. The device of example 9, wherein the one or more means comprise one or more processors implemented in circuitry.

Example 11. The device of any of examples 9 and 10, further including a memory to store the video data.

Example 12. The device of any of examples 9-11, further including a display configured to display decoded video data.

Example 13. The device of any of examples 9-12, wherein the device comprises one or more of a camera, a computer, a mobile device, a broadcast receiver device, or a set-top box.

Example 14. The device of any of examples 9-13, wherein the device comprises a video decoder.

Example 15. The device of any of examples 9-14, wherein the device comprises a video encoder.

Example 16. A computer-readable storage medium having stored thereon instructions that, when executed, cause one or more processors to perform the method of any of examples 1-8.

Example 17. A device for encoding video data, the device including means for performing the methods of any of examples 1-8.

Example 18. A computer-readable data storage medium having instructions stored thereon that, when executed, cause a computing device to perform the methods of any of examples 1-8.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
for each respective location in a plurality of locations in a filter support, coding an adaptive loop filter (ALF) clipping index for the respective location in the filter support as a fixed-length unsigned integer regardless of a value of a corresponding filter coefficient of an ALF, wherein the corresponding filter coefficient of the ALF is a filter coefficient for the respective location in the filter support; and
applying the ALF to a block of a picture of the video data, wherein applying the ALF to the block comprises, for each respective sample of the block:
for each respective location in the plurality of locations in the filter support:

using the ALF clipping index for the respective location in the filter support to determine a set of clipping values for the respective location in the filter support;

using the clipping values for the respective location in the filter support to clip a value for a sample at the respective location in the filter support, wherein the clipping values for the respective location in the filter support specify an upper limit and a lower limit on the value for the sample at the respective location in the filter support; and generating a multiplication product for the respective location in the filter support by multiplying the clipped value for the sample at the respective location in the filter support by the filter coefficient for the respective location in the filter support; and determining a filtered value for the respective sample of the block based on a value of the respective sample of the block and a sum of the multiplication products for the plurality of locations in the filter support.

2. The method of claim 1, wherein, for each respective location in the plurality of locations in the filter support, the ALF clipping index for the respective location in the filter support is a luma ALF clipping index.

3. The method of claim 1, wherein, for each respective location in the plurality of locations in the filter support, the ALF clipping index for the respective location in the filter support is a chroma ALF clipping index.

4. The method of claim 1, wherein:

the filter support is a first filter support, for each respective location in the plurality of locations in the first filter support, the ALF clipping index for the respective location in the first filter support is a luma ALF clipping index and the block of the picture is a luma block, and the method further comprises:

for each respective location in a plurality of locations in a second filter support, coding a chroma ALF clipping index for the respective location in the second filter support as a fixed-length unsigned integer; and applying the ALF to a chroma block of the picture, wherein applying the ALF to the chroma block comprises, for each respective sample of the chroma block:

for each respective location in the plurality of locations in the second filter support:

using the chroma ALF clipping index for the respective location in the second filter support to determine a set of clipping values for the respective location in the second filter support;

using the clipping values for the respective location in the second filter support to clip a value for a chroma sample at the respective location in the second filter support, wherein the clipping values for the respective location in the second filter support specify an upper limit and a lower limit on the value for the chroma sample at the respective location in the second filter support; and generating a multiplication product for the respective location in the second filter support by multiplying the clipped value for the chroma sample at the respective location in the second filter support by a filter coefficient for the respective location in the second filter support; and determining a filtered value for the respective sample of the chroma block based on a value of the respective sample of the chroma block and a sum of the multiplication products for the plurality of locations in the second filter support.

5. The method of claim 1, wherein the method further comprises determining that the corresponding filter coefficient of the ALF is equal to 0.

6. The method of claim 1, wherein coding comprises decoding.

7. The method of claim 6, wherein coding the ALF clipping index for the respective location in the filter support comprises parsing the fixed-length unsigned integer from a bitstream that includes an encoded representation of the video data.

8. The method of claim 1, wherein coding comprises encoding.

9. The method of claim 8, wherein coding the ALF clipping index for the respective location in the filter support comprises including the fixed-length unsigned integer in a bitstream that includes an encoded representation of the video data.

10. A device for coding video data, the device comprising:

a memory configured to store the video data; and one or more processors implemented in circuitry, the one or more processors configured to:

for each respective location in a plurality of locations in a filter support, code an adaptive loop filter (ALF) clipping index for the respective location in the filter support as a fixed-length unsigned integer regardless of a value of a corresponding filter coefficient of an ALF, wherein the corresponding filter coefficient of the ALF is a filter coefficient for the respective location in the filter support; and apply the ALF to a block of a picture of the video data wherein the one or more processors are configured to, as part of applying the ALF to the block, for each respective sample of the block:

for each respective location in the plurality of locations in the filter support:

use the ALF clipping index for the respective location in the filter support to determine a set of clipping values for the respective location in the filter support;

use the clipping values for the respective location in the filter support to clip a value for a sample at the respective location in the filter support, wherein the clipping values for the respective location in the filter support specify an upper limit and a lower limit on the value for the sample at the respective location in the filter support; and generate a multiplication product for the respective location in the filter support by multiplying the clipped value for the sample at the respective location in the filter support by the filter coefficient for the respective location in the filter support; and determine a filtered value for the respective sample of the block based on a value of the respective sample of the block and a sum of the multiplication products for the plurality of locations in the filter support.

11. The device of claim 10, wherein, for each respective location in the plurality of locations in the filter support, the ALF clipping index for the respective location in the filter support is a luma ALF clipping index.

12. The device of claim 10, wherein, for each respective location in the plurality of locations in the filter support, the ALF clipping index for the respective location in the filter support is a chroma ALF clipping index.

13. The device of claim 10, wherein:

the filter support is a first filter support, for each respective location in the plurality of locations in the first filter support, the ALF clipping index for the respective location in the first filter support is a luma ALF clipping index and the block of the picture is a luma block, and the one or more processors are further configured to:

for each respective location in a plurality of locations in a second filter support, code a chroma ALF clipping index for the respective location in the second filter support as a fixed-length unsigned integer; and apply the ALF to a chroma block of the picture, wherein the one or more processors are configured to, as part of applying the ALF to the chroma block, for each respective sample of the chroma block:

for each respective location in the plurality of locations in the second filter support:

use the chroma ALF clipping index for the respective location in the second filter support to determine a set of clipping values for the respective location in the second filter support;

use the clipping values for the respective location in the second filter support to clip a value for a chroma sample at the respective location in the second filter support, wherein the clipping values for the respective location in the second filter support specify an upper limit and a lower limit on the value for the chroma sample at the respective location in the second filter support; and generate a multiplication product for the respective location in the second filter support by multiplying the clipped value for the chroma sample at the respective location in the second filter support by a filter coefficient for the respective location in the second filter support; and determine a filtered value for the respective sample of the chroma block based on a value of the respective sample of the chroma block and a sum of the multiplication products for the plurality of locations in the second filter support.

14. The device of claim 10, wherein the one or more processors are configured to determine that the corresponding filter coefficient of the ALF is equal to 0.

15. The device of claim 10, wherein, to code the ALF clipping index for the respective location in the filter support, the one or more processors are configured to parse the fixed-length unsigned integer from a bitstream that includes an encoded representation of the video data.

16. The device of claim 10, wherein, to code the ALF clipping index for the respective location in the filter support, the one or more processors are configured to include the fixed-length unsigned integer in a bitstream that includes an encoded representation of the video data.

17. The device of claim 10, further comprising a display configured to display decoded video data.

18. The device of claim 10, wherein the device comprises one or more of a camera, a computer, a mobile device, a broadcast receiver device, or a set-top box.

19. The device of claim 10, wherein the device comprises a video decoder.

20. The device of claim 10, wherein the device comprises a video encoder.

21. A device for coding video data, the device comprising:

means for coding, for each respective location in a plurality of locations in a filter support, an adaptive loop filter (ALF) clipping index for the respective location in the filter support as a fixed-length unsigned integer regardless of a value of a corresponding filter coefficient of an ALF, wherein the corresponding filter coefficient of the ALF is a filter coefficient for the respective location in the filter support; and means for applying the ALF to a block of a picture of the video data, wherein the means for applying the ALF to the block comprises, for each respective sample of the block:

for each respective location in the plurality of locations in the filter support:

means for using the ALF clipping index for the respective location in the filter support to determine a set of clipping values for the respective location in the filter support;

means for using the clipping values for the respective location in the filter support to clip a value for a sample at the respective location in the filter support, wherein the clipping values for the respective location in the filter support specify an upper limit and a lower limit on the value for the sample at the respective location in the filter support; and means for generating a multiplication product for the respective location in the filter support by multiplying the clipped value for the sample at the respective location in the filter support by the filter coefficient for the respective location in the filter support; and means for determining a filtered value for the respective sample of the block based on a value of the respective sample of the block and a sum of the multiplication products for the plurality of locations in the filter support.

22. The device of claim 21, wherein, for each respective location in the plurality of locations in the filter support, the ALF clipping index for the respective location in the filter support is a luma ALF clipping index.

23. The device of claim 21, wherein, for each respective location in the plurality of locations in the filter support, the ALF clipping index for the respective location in the filter support is a chroma ALF clipping index.

24. The device of claim 21, wherein:

the filter support is a first filter support, for each respective location in the plurality of locations in the first filter support, the ALF clipping index for the respective location in the first filter support is a luma ALF clipping index and the block of the picture is a luma block, and the device further comprises:

for each respective location in a plurality of locations in a second filter support, means for coding a chroma ALF clipping index for the respective location in the second filter support as a fixed-length unsigned integer; and means for applying the ALF to a chroma block of the picture, wherein the means for applying the ALF to the chroma block comprises, for each respective sample of the chroma block:

for each respective location in the plurality of locations in the second filter support:

means for using the chroma ALF clipping index for the respective location in the second filter support to determine a set of clipping values for the respective location in the second filter support;

means for using the clipping values for the respective location in the second filter support to clip a value for a chroma sample at the respective location in the second filter support, wherein the clipping values for the respective location in the second filter support specify an upper limit and a lower limit on the value for the chroma sample at the respective location in the second filter support; and means for generating a multiplication product for the respective location in the second filter support by multiplying the clipped value for the chroma sample at the respective location in the second filter support by a filter coefficient for the respective location in the second filter support; and means for determining a filtered value for the respective sample of the chroma block based on a value of the respective sample of the chroma block and a sum of the multiplication products for the plurality of locations in the second filter support.

25. The device of claim 21, further comprising means for determining that the corresponding filter coefficient of the ALF is equal to 0.

26. The device of claim 21, wherein the means for coding the ALF clipping index for the respective location in the filter support comprises means for parsing the fixed-length unsigned integer from a bitstream that includes an encoded representation of the video data.

27. The device of claim 21, wherein the means for coding the ALF clipping index for the respective location in the filter support comprises means for including the fixed-length unsigned integer in a bitstream that includes an encoded representation of the video data.

28. A non-transitory computer-readable storage medium having stored thereon instructions that, when executed, cause one or more processors to:

for each respective location in a plurality of locations in a filter support, code an adaptive loop filter (ALF) clipping index for the respective location in the filter support as a fixed-length unsigned integer regardless of a value of a corresponding filter coefficient of an ALF, wherein the corresponding filter coefficient of the ALF is a filter coefficient for the respective location in the filter support; and apply the ALF to a block of a picture of video data wherein the instructions that cause the one or more processors to apply the ALF to the block comprises instructions that, when executed, cause the one or more processors to, for each respective sample of the block:

for each respective location in the plurality of locations in the filter support:

use the ALF clipping index for the respective location in the filter support to determine a set of clipping values for the respective location in the filter support;

use the clipping values for the respective location in the filter support to clip a value for a sample at the respective location in the filter support, wherein the clipping values for the respective location in the filter support specify an upper limit and a lower limit on the value for the sample at the respective location in the filter support; and generate a multiplication product for the respective location in the filter support by multiplying the clipped value for the sample at the respective location in the filter support by the filter coefficient for the respective location in the filter support; and determine a filtered value for the respective sample of the block based on a value of the respective sample of the block and a sum of the multiplication products for the plurality of locations in the filter support.

29. The non-transitory computer-readable storage medium of claim 28, wherein, for each respective location in the plurality of locations in the filter support, the ALF clipping index for the respective location in the filter support is a luma ALF clipping index.

30. The non-transitory computer-readable storage medium of claim 28, wherein, for each respective location in the plurality of locations in the filter support, the ALF clipping index for the respective location in the filter support is a chroma ALF clipping index.

31. The non-transitory computer-readable storage medium of claim 28, wherein:

the filter support is a first filter support, for each respective location in the plurality of locations in the first filter support, the ALF clipping index for the respective location in the first filter support is a luma ALF clipping index and the block of the picture is a luma block, and execution of the instructions further causes the one or more processors to:

for each respective location in a plurality of locations in a second filter support, code a chroma ALF clipping index for the respective location in the second filter support as a fixed-length unsigned integer; and apply the ALF to a chroma block of the picture, wherein the instructions that cause the one or more processors to apply the ALF to the chroma block comprise instructions that, when executed, cause the one or more processors to, for each respective sample of the chroma block:

for each respective location in the plurality of locations in the second filter support:

use the chroma ALF clipping index for the respective location in the second filter support to determine a set of clipping values for the respective location in the second filter support;

use the clipping values for the respective location in the second filter support to clip a value for a chroma sample at the respective location in the second filter support, wherein the clipping values for the respective location in the second filter support specify an upper limit and a lower limit on the value for the chroma sample at the respective location in the second filter support; and generate a multiplication product for the respective location in the second filter support by multiplying the clipped value for the chroma sample at the respective location in the second filter support by a filter coefficient for the respective location in the second filter support; and determine a filtered value for the respective sample of the chroma block based on a value of the respective sample of the chroma block and a sum of the multiplication products for the plurality of locations in the second filter support.

32. The non-transitory computer-readable storage medium of claim 28, wherein execution of the instructions further causes the one or more processors to determine that the corresponding filter coefficient of the ALF is equal to 0.

33. The non-transitory computer-readable storage medium of claim 28, wherein the instructions that cause the one or more processors to code the ALF clipping index for the respective location in the filter support include instructions that cause the one or more processors to parse the fixed-length unsigned integer from a bitstream that includes an encoded representation of the video data.

* * * * *